United States Patent
Goh et al.

(10) Patent No.: US 7,694,049 B2
(45) Date of Patent: Apr. 6, 2010

(54) RATE CONTROL OF FLOW CONTROL UPDATES

(75) Inventors: Chee How Goh, Ipoh (MY); Thian Aun Tan, Bayan Lepas (MY); Mikal C. Hunsaker, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 347 days.

(21) Appl. No.: 11/321,362

(22) Filed: Dec. 28, 2005

(65) Prior Publication Data

US 2007/0174344 A1    Jul. 26, 2007

(51) Int. Cl.
*G06F 13/00*  (2006.01)
*G06F 12/00*  (2006.01)
*G06F 1/00*   (2006.01)

(52) U.S. Cl. ............... 710/107; 707/200; 713/300
(58) Field of Classification Search .......... 713/300; 707/200; 710/107
See application file for complete search history.

(56) References Cited

U.S. PATENT DOCUMENTS

| | | | | |
|---|---|---|---|---|
| 6,618,354 B1* | 9/2003 | Sharma | ........ | 370/229 |
| 6,760,793 B2* | 7/2004 | Kelley et al. | ........ | 710/52 |
| 7,219,175 B1* | 5/2007 | Davis et al. | ........ | 710/105 |
| 2003/0204653 A1* | 10/2003 | Katayama | ........ | 710/52 |
| 2005/0259651 A1* | 11/2005 | Yashima | ........ | 370/389 |
| 2007/0067548 A1* | 3/2007 | Juenger | ........ | 710/315 |
| 2007/0121495 A1* | 5/2007 | Breti et al. | ........ | 370/229 |

OTHER PUBLICATIONS

U.S. Appl. No. 11/003,686; Title: Controlling Issuance of Request; Inventor: Kar Leong Wong; Filing Date: Dec. 3, 2004.
U.S. Appl. No. 11/026,968; Title: Autodetection of a PCI Express Device Operating at a Wireless RF Mitigation; Inventor: Mikal C. Hunsaker; Filing Date: Dec. 29, 2004.
U.S. Appl. No. 10/975,132; Title: Transaction Layer Link Down Handling for PCI Express; Inventor: Kar Leong Wong; Filing Date: Oct. 27, 2004.
U.S. Appl. No. 10/975,593; Title: Starvation Prevention Scheme for a Fixed Priority PCI-Express Arbiter With Grant Counters Using Arbitration Pools; Inventor: Khee Wooi Lee; Filing Date: Oct. 28, 2004.

* cited by examiner

*Primary Examiner*—Mark Rinehart
*Assistant Examiner*—Christopher A Daley
(74) *Attorney, Agent, or Firm*—Caven & Aghevli LLC

(57) ABSTRACT

Various embodiments adjust the rate at which periodic flow control updates are transmitted when in a lower power or power saving state. One embodiment transmits flow control updates across a bus based upon a first rate in response to a normal power mode and transmits second flow control updates across the bus based upon a second rate in response to a power saving mode.

26 Claims, 6 Drawing Sheets

RATE CONTROL OF FLOW CONTROL UPDATES

BACKGROUND

In Peripheral Components Interface (PCI) Express architecture, flow control is a method for communicating receive buffer status from a receiver to a transmitter so as to prevent receive buffer overflow and allow transmitter compliance with ordering rules. The PCI Express specification requires a flow control (FC) update be sent at least once every 30-45 µs (microseconds). As a result, a PCI express interface and possibly other components of a computing device may exit low power/power saving states at least once every 30-45 µs to send an FC update even if there is no change in buffer status and thus no change in the FC update.

PCI Express provides the ability to support different types of traffic or Traffic Class with different levels of service through Virtual Channels. Virtual Channel 0 (VC0) provides the best effort class of service and is analogous to traditional PCI traffic. Virtual channel 1 (VC1) is added to provide guaranteed latency such as required by Isochronous traffic. Further, the PCI Express specification defines six types of FC credits (e.g. Posted Request Header, Non-Posted Request Data Payload, Completion Data Payload, etc.). Each virtual Channel maintains an independent FC credit pool. The PCI Express interfaces have been implemented with a separate periodic counter or timer for each type of FC credit. The periodic timer causes an FC update for its respective type of FC credit to be sent at least once every 30-45 µs. Due to the multiple periodic timers being driven by 10 µs clock signals, a PCI express interface and possibly other components of a computing device may actually exit low power/power saving states every 10 µs to send an FC update even if there is no change in the FC update.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

In the following detailed description, numerous specific details are described in order to provide a thorough understanding of the invention. However the present invention may be practiced without these specific details. In other instances well known methods, procedures, components and circuits have not been described in detail so as not to obscure the present invention. Further, example sizes/models/values/ranges may be given, although the present invention is not limited to these specific examples.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Figure 1:
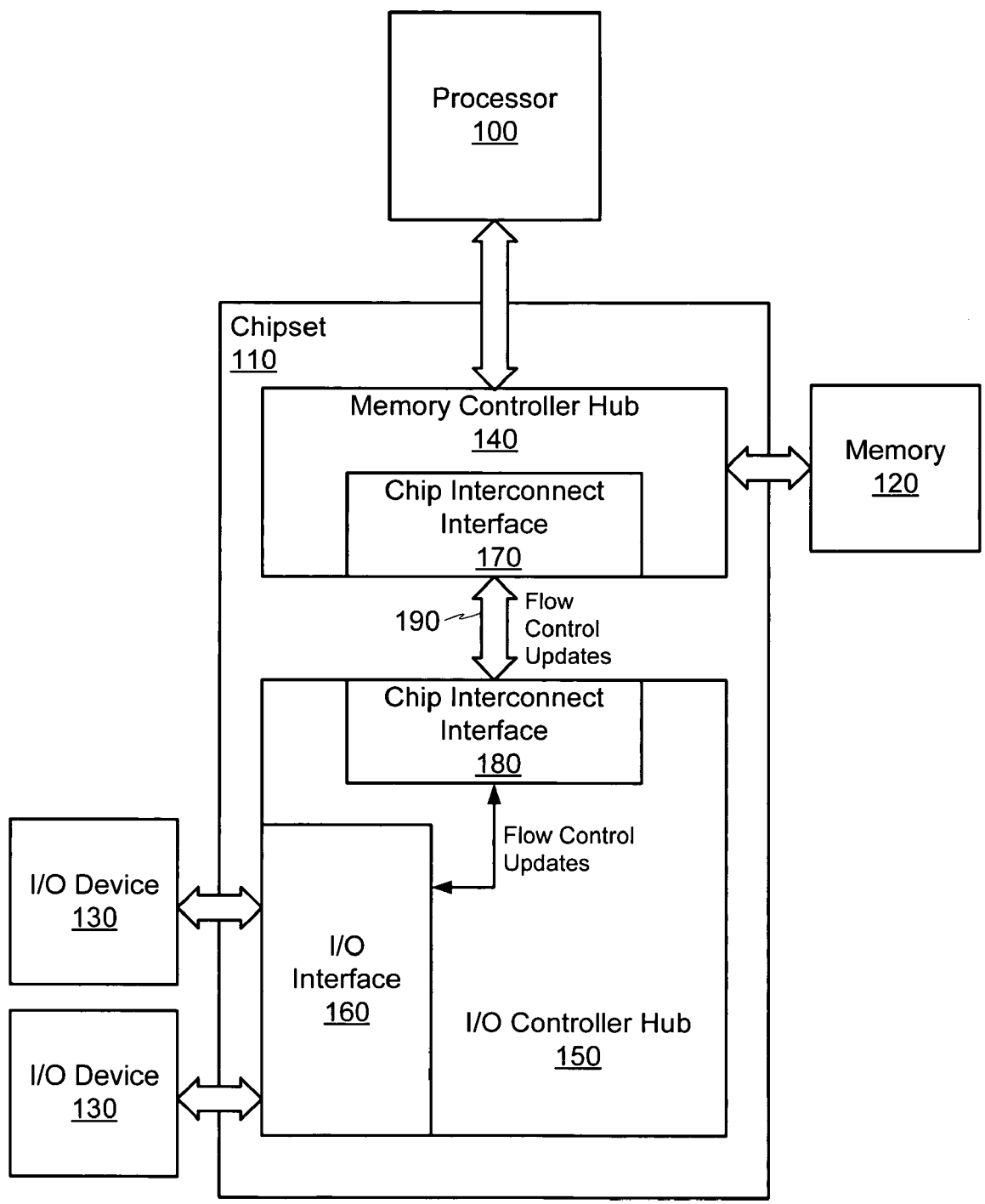
FIG. 1 illustrates an embodiment of a computer system.

Referring to FIG. 1, an embodiment of a computer system is shown. The computer system may include a processor 100, a chipset 110, a memory 120, and I/O (input/output) devices 130. As depicted, the processor 100 may be coupled with the chipset 110 via a processor bus. The memory 120 may be coupled with the chipset 110 via a memory bus. The I/O devices 130 may be coupled with the chipset 110 via an I/O bus such as, for example, PCI (Peripheral Component Interconnect) buses, PCI Express buses, USB (Universal Serial Bus) buses, SATA (Serial Advanced Technology Attachment) buses, etc.

The processor 100 may be implemented with an Intel® Pentium® 4 processor, Intel® Pentium® M processor, and/or another type of general purpose processor 100 capable of executing software and/or firmware instructions. In one embodiment, the processor 100 may execute instructions stored in the memory 120 to perform various tasks and to control the overall operation of the computer system. In particular, the processor 100 may execute instructions and/or routines related to flow control (FC) update tasks such as, for example, programming FC policy registers, tracking FC credits, and sending FC updates. The processor 100 may also execute instructions and/or routines related to power management such as, causing a component such as an I/O controller to enter a power saving mode when certain criteria (e.g. idle periods, timeouts, battery usage, etc.) are satisfied.

The chipset 110 may comprise one or more integrated circuits or chips to couple the processors 100 with other components of the computer system. As depicted, the chipset 110 may comprise a memory controller hub 140 and an I/O controller hub (ICH) 150. The memory controller hub 140 may provide an interface to memory devices of the memory 120. In particular, the memory controller hub 140 may generate signals on the memory bus to read and/or write data to memory devices of the memory 120 in response to requests from the processor 100 and I/O devices 130. The memory 120 may comprise for example RAM (Random Access Memory) devices such as source synchronous dynamic RAM devices and DDR (Double Data Rate) RAM devices.

The I/O controller hub 150 according to an embodiment may comprise an I/O interface 160 such as, for example, a PCI Express interface. The I/O interface 160 may interface the I/O devices 130 with the I/O controller hub 150, thus permitting data transfers between the processor 100 and the I/O devices 130 and between the memory 120 and the I/O devices 130. Further, the I/O interface 160 may utilize FC credits to track status of send and receive buffers associated with the I/O devices 130 to prevent buffer underflow and/or overflow conditions.

The memory controller hub 140 and the I/O controller hub 150 may each comprise a chip interconnect interface 170, 180 such as, an Intel® Direct Media Interface (DMI). The chip interconnect interfaces 170, 180 couple to a interconnect bus 190 (e.g. a DMI link) to provide a communication path between the memory controller hub 140 and the I/O controller hub 150. In particular, the chip interconnect interfaces 170, 180 and the interconnect bus 190 transfer FC updates associated with the I/O interface 160. In one embodiment, the chip interconnect interfaces 170, 180 and interconnect bus 190 provide a serial point-to-point link between the memory controller hub 140 and the I/O controller hub 150 that delivers up to 2.0 GB/s (gigabyte/second) concurrent bandwidth.

Moreover, the chip interconnect interfaces 170, 180 and interconnect bus 190 experience very few transmission errors in practice, thus greatly reducing the need for retrying or resending information such as FC updates.

As depicted, the computer system may also comprise I/O devices 130. The I/O device 130 may implement various input/output functions for the computer system. For example, the I/O device 130 may comprise hard disk drives, keyboards, mice, CD (compact disc) drives, DVD (digital video discs) drives, printers, scanners, etc.

Figure 2:
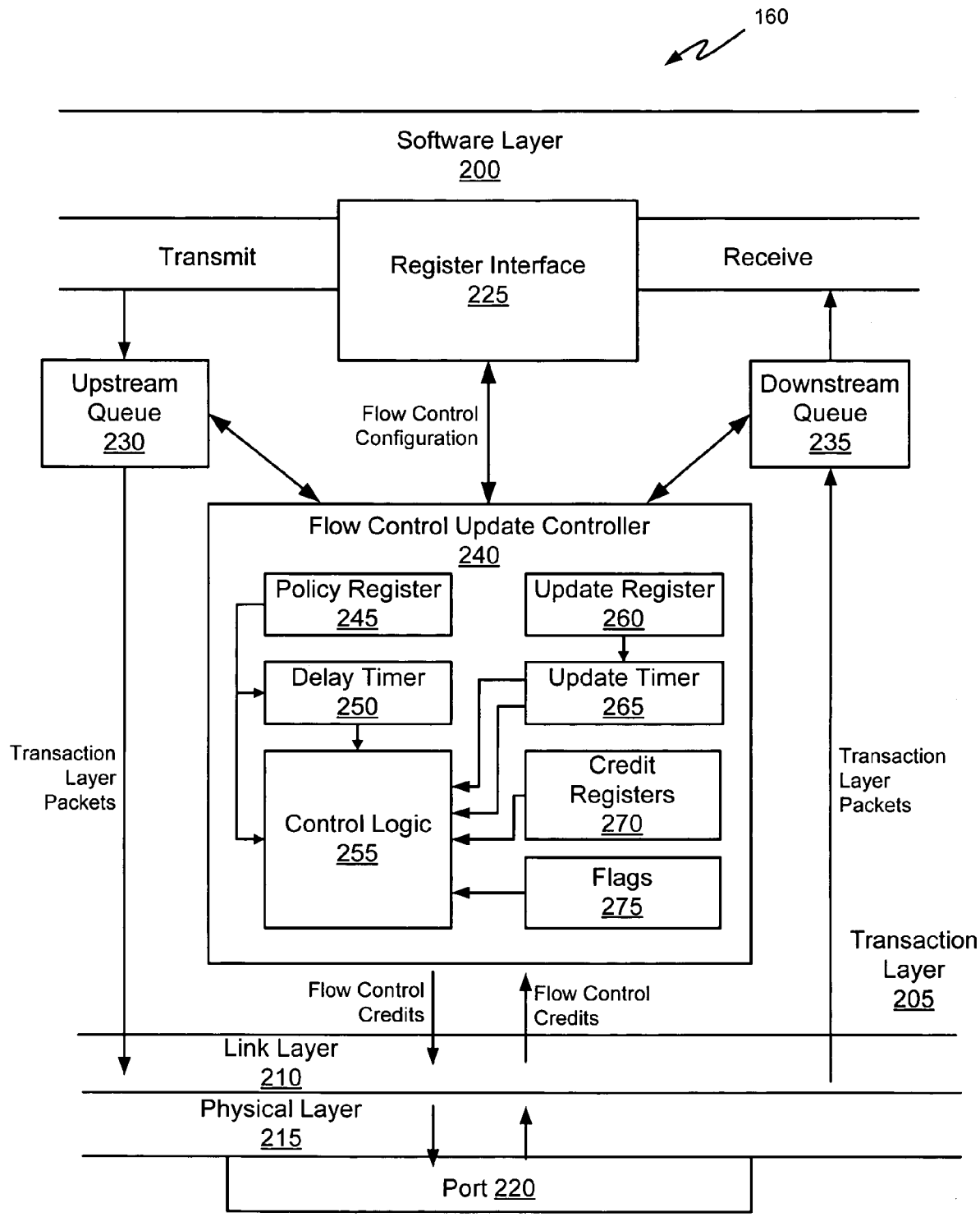
FIG. 2 illustrates an embodiment of an I/O interface of the computer system shown in FIG. 1.

FIG. 2 depicts a layered embodiment of the I/O interface 160. The I/O interface 160 may comprise a software layer 200, a transaction layer 205, a link layer 210, a physical layer 215 and a port 220 that provides an electrical interface to effectively couple the I/O interface 160 to an I/O interface of another chip or device. The transaction layer 205 may comprise a register interface 225, an upstream queue 230, a downstream queue 235 and an FC update controller 240.

The register interface 225 in one embodiment may configure the FC update controller 240 via software of the software layer 200. For example, the register interface 225 may enable the software layer to read and/or write to registers of the FC update controller 240. The upstream queue 230 may receive and queue transactions and FC updates to be sent via the port 220. The downstream queue 235 may receive and queue transactions and FC updates received via the port 24.

The FC update controller 240 may cause FC updates to be sent through the link layer 210, the physical layer 215 and the port 220 from one chip (e.g. I/O controller hub 150) to another chip (e.g. memory controller hub 140). The FC update controller 240 may cause FC updates be transmitted based on a first rate in response to a normal power mode. Also, the FC update controller 240 may cause FC updates be transmitted based on a second rate that is slower (i.e. has a longer period) than the first rate associated with the normal power mode in response to a power saving or low power mode.

According to an embodiment of the FC update controller 240, an exchange of FC credits may occur in response to every transaction between a producer (e.g. a transmitting I/0 interface) and a consumer (e.g. a receiving I/O interface). Once a transaction and its associated FC credits are consumed, the consumer may send updated FC credit information to the producer to inform the producer of buffer availability in the consumer. These FC updates may be opportunistically included with other transactions between a producer and a consumer. However, even when no transactions are taking place, the FC update controller 240 may still send periodic FC updates to maintain consistency of FC credit information between consumers and producers. For example, the PCI Express standard requires sending FC updates either opportunistically in other transactions or as a separate transaction every 30-45 μs. However, this PCI Express requirement may unnecessary result in the I/O interface 160 (as well as other components such as the interconnect interfaces 170, 180) exiting from a low power link state to simply send FC updates even though no change in FC credits has occurred and therefore no real need for an FC update exists. As a result, components may consume more power due to sending FC updates every 30-45 μs than if permitted to remain in a low power state longer than 30-45 μs or until a change in FC credits occurs.

The FC update controller 240 may comprise a policy register 245, a delay timer 250, control logic 255, an update register 260, an update timer 265, credit registers 270 and flags 275. The credit registers 270 may store FC credit information to track FC credits based upon FC credits received and FC credits consumed. The flags 275 may track various status conditions associated with transmitting and receiving transactions and FC updates.

In one embodiment, the policy register 245 may comprise a configuration register that is programmable via the register interface 225. The programmed value of the policy register 245 may define an update policy or update mode to affect the operation of the FC update controller 240. In particular, the policy register 245 may define a delay period for the delay timer 250. The delay timer 250 may cause the FC update controller 240 to wait up to the specified delay period from an FC credit update before sending an FC update which may enable multiple FC credit updates to be combined into a single FC update. In one embodiment, the policy register 245 may result in the FC update controller 240 not waiting as discussed below in regard to FIG. 6. Accordingly, the policy register 245 may define whether the FC update controller 240 is to operate in a "wait" mode or "no wait" mode of operation.

The update register 260 in one embodiment may define an update window of the update timer 265. In one embodiment, the update register 260 may comprise a two bit configuration which is programmable via the register interface 225 to define four update modes. In particular, the update register 260 may cause the update timer 265 to define a 30-40 μs (microsecond) update window, a 300-400 μs update window, or a 3-4 ms (millisecond) update window respectively in response to first update mode, a second update mode, and a third update mode for use in a low power state. Moreover, the fourth update mode of the update register 260 may also define a 30-40 μs update window, but as will be explained below, when in the fourth update mode or "demand" mode, FC updates are sent twice and not sent again until "demanded" by a change in FC credits. Accordingly, when operating in the modes with an update window longer than the 30-40 μs window or when in the "demand" mode, the I/O interface 160 has the opportunity to remain in a low power state longer than a conventional PCI Express interface since FC updates are not necessarily sent across the interconnect link 190 every 30-45 μs as specified in the PCI Express standard.

In one embodiment, the control logic 255 may support both a normal power state and a low power state. During a normal power state, the control logic 255 may ensure that FC updates are sent at least every 30-40 μs to comply with PCI Express requirements. During a power saving or low power state, the control logic 255 may cause FC updates be sent at least every 30-40 μs, 300-400 μs or 3-4 ms depending on the setting of the update register 260. In one embodiment, the interconnect bus 190 may have very low bit loss and thus FC updates across the interconnect bus 190 may largely be disabled altogether. Therefore, in one embodiment, setting of the policy register 245 to demand mode state may ensure that after the same FC credits have been sent twice, no further FC updates are sent until a change in FC credits occurs.

Figure 3:
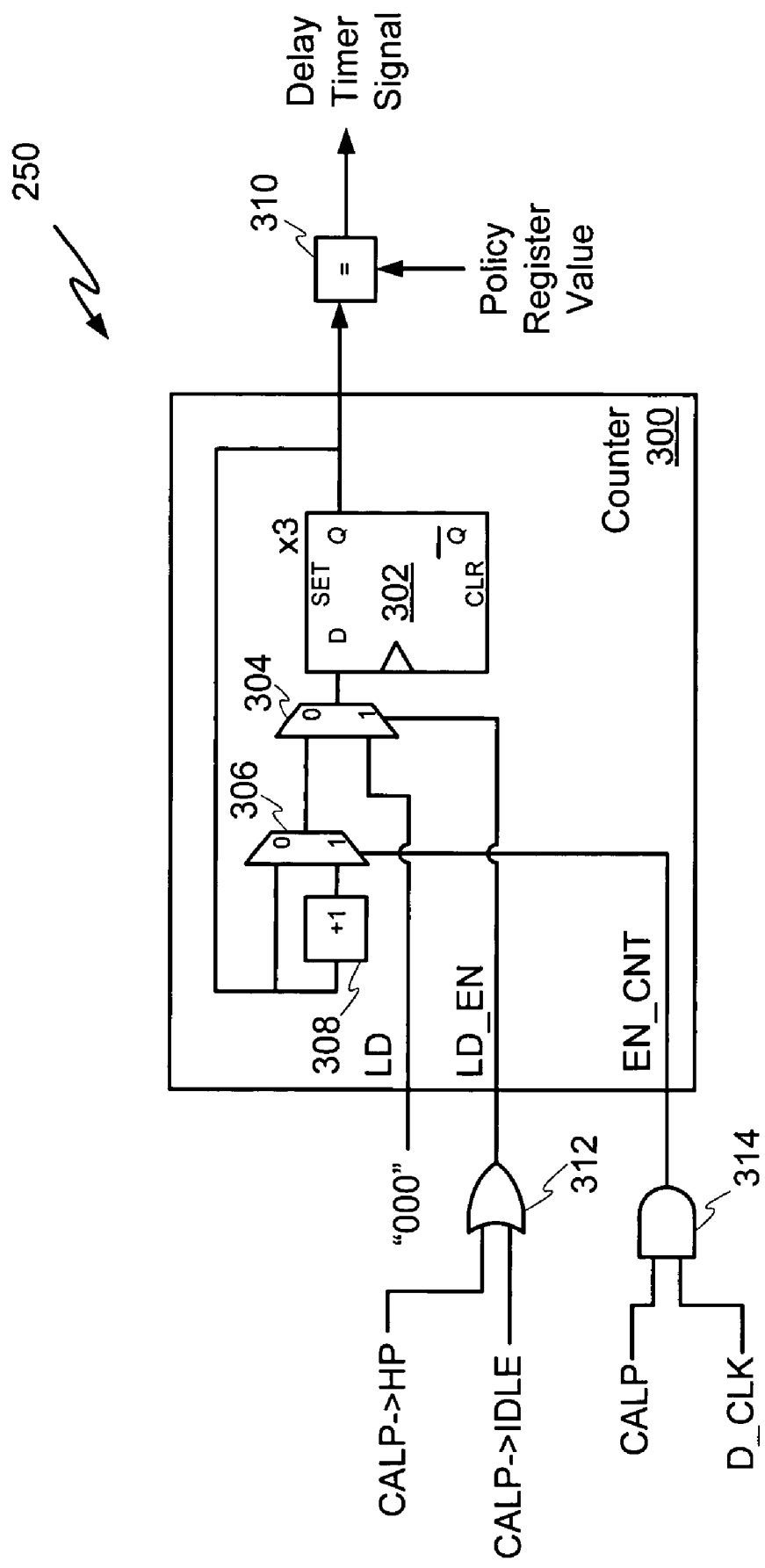
FIG. 3 illustrates an embodiment of the delay timer shown in FIG. 2.

Referring now to FIG. 3, one embodiment of the delay timer 250 is illustrated. As depicted, the delay timer 250 may comprise a counter 300 having a load enable LD_EN, a load input LD, and a count enable EN_CNT. The counter 300 may update a count value in response to the count enable EN_CNT being asserted when the load enable LD_EN is deasserted. Further, the counter 300 may load a value applied to the load input LD in response to the count enable EN_CNT being asserted when the load enable LD_EN is asserted. To this end, the counter 300 in one embodiment may comprise three flip-flops 302, multiplexers 304, 306, and an incrementor 308 that cooperate to provide a three bit counter that increments by a value of 1 in response to the count enable EN_CNT being asserted when the load enable LD_EN is deasserted and that loads a value provided on the load input LD in response to the count enable EN_CNT being asserted when the load enable LD_EN is asserted.

The delay timer 250 may further comprise a comparator 310 to compare the count of the counter 300 with the value of the policy register 245 and assert a delay timer expired signal in response to the count and value having a predetermined relationship (e.g. equal to). The delay timer 250 may further comprise an OR gate 312 to assert the load enable LD_EN based upon received signals. In particular, the OR gate 312 in one embodiment asserts the load enable LD_EN in response to either assertion of a CALP->HP signal that indicates a transition from the CALP state to the HP state or assertion of a CALP->IDLE signal that indicates a transition from the CALP state to the IDLE state (See, FIG. 6).

Furthermore, the delay timer 250 further comprises an AND gate 314 to assert the count enable EN_CNT. The AND gate 314 may assert the count enable when a CALP signal to indicate a CALP state and a clock signal D_CLK used to drive the delay timer 250 are both asserted. In one embodiment, the control logic 255 may reset the delay timer 250 to an initial value (e.g. "000") when leaving the CALP state thus result in the delay timer 250 deasserting or maintaining a signal in a deasserted state to indicate a delay period has not expired since entering the CALP state. Furthermore, the delay timer 250 may assert a delay timer expired signal to indicate a delay period defined by the value of the policy register 245 has expired since entering the CALP state.

Figure 4:
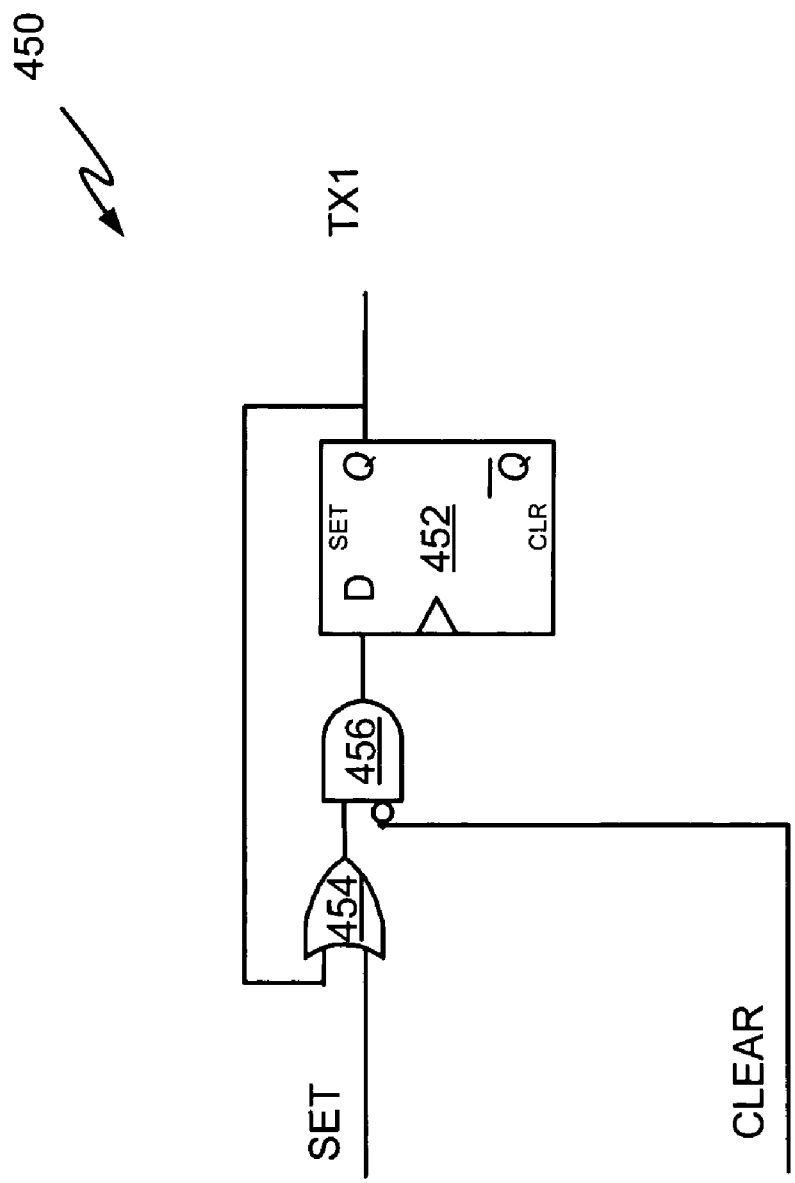
FIG. 4 illustrates an embodiment of a transmit once flag of the flags shown in FIG. 2.

Referring now to FIG. 4, an embodiment of a transmit-once flag 450 of the flags 275 is illustrated. The flag 450 may comprise a flip-flop 452, an OR gate 454, and a AND gate 456. The flip-flop 452 may store the current status of the flag 450 and may update a transmit once signal TX1 to reflect the status of the flag 450. In particular, the OR gate 454 an AND gate 456 result in the flip-flop 452 asserting the transmit once signal TX1 in response to the control logic 255 asserting a set input SET of the flag 450 when the same FC update has been sent and deasserting the transmit once signal TX1 in response to the control logic 255 asserting a clear input CLEAR to reset when there is a change in FC credit.

Figure 5:
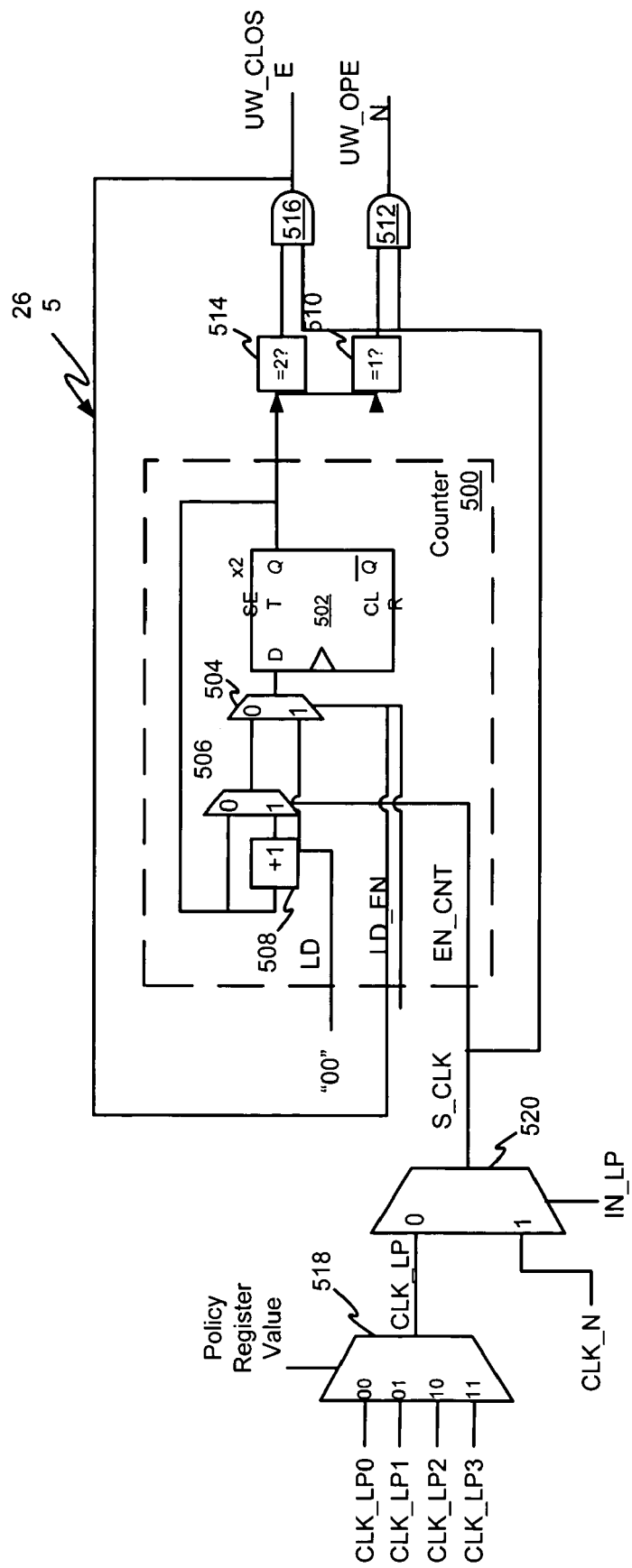
FIG. 5 illustrates an embodiment of an update timer shown in FIG. 2.

Referring now to FIG. 5, one embodiment of the update timer 265 is illustrated. As depicted, the update timer 265 may comprise a counter 500 having a load enable LD_EN, a load input LD, and a count enable EN_CNT. The counter 500 may update a count value in response to the count enable EN_CNT being asserted when the load enable LD_EN is deasserted. Further, the counter 500 may load a value applied to the load input LD in response to the count enable EN_CNT being asserted when the load enable LD_EN is asserted. To this end, the counter 500 in one embodiment may comprise two flip-flops 502, multiplexers 504, 506, and an incrementor 508 that cooperate to provide a two bit counter that increments by a value of 1 in response to the count enable EN_CNT being asserted when the load enable LD_EN is deasserted and that loads a value provided on the load input LD in response to the count enable EN_CNT being asserted when the load enable LD_EN is asserted.

The update timer 250 may further comprise a first comparator 510 and a first AND gate 512 to assert an UW_OPEN signal to indicate the opening of a periodic update window and a second comparator 514 and second AND gate 516 to assert a UW_CLOSE signal to indicate the closing or expiration of the periodic update window. In one embodiment, the first comparator 510 provides an asserted signal to the first AND gate 512 when the count is "1" thus resulting in the first AND gate 512 asserting the UW_OPEN signal when a selected clock signal S_CLK is asserted. Similarly, the second comparator 514 provides an asserted signal to the second AND gate 516 when the count is "2" thus resulting in the second AND gate 516 asserting the UW_CLOSE signal when the selected clock signal S_CLK is asserted.

The update timer 250 may further comprise two multiplexers 518, 520 to select a clock signal for driving the counter 500. In particular, the first mulitpliexor 518 in one embodiment receives four clock signals CLK_LP0, CLK_LP1, CLK_LP2, CLK_LP3 and selects one of these four clock signals based upon the value of the policy register 280 to drive the counter 500. The second multiplexer 520 receives the clock signal CLK_LP selected by the first multiplexer 518 and a normal clock signal CLK_N and selects between the lower power clock signal CLK_LP and the normal clock signal CLK_N based upon a low power state signal IN_LP which when asserted indicates the interconnect interface 180 is in a low power state.

In one embodiment, the clock signal CLK_LP0 has a 10 μs clock period, the clock signal CLK_LP1 has a 100 μs clock period, the clock signal CLK_LP2 has a 1 ms clock period, the clock signal CLK_LP3 has a 10 μs clock period, and the clock signal CLK_N has a 10 ps clock period. As a result, the update timer 275 defines a 30-40 μs update window in response to any of the 10 μs clock signals CLK_LP0, CLK_LP3, CLK_N being selected, a 300-400 μs update window in response to the 100 μs clock signal CLK_LP1 being selected, and a 3-4 ms update window in response to the 1 ms clock signal CLK_2 being selected.

Figure 6:
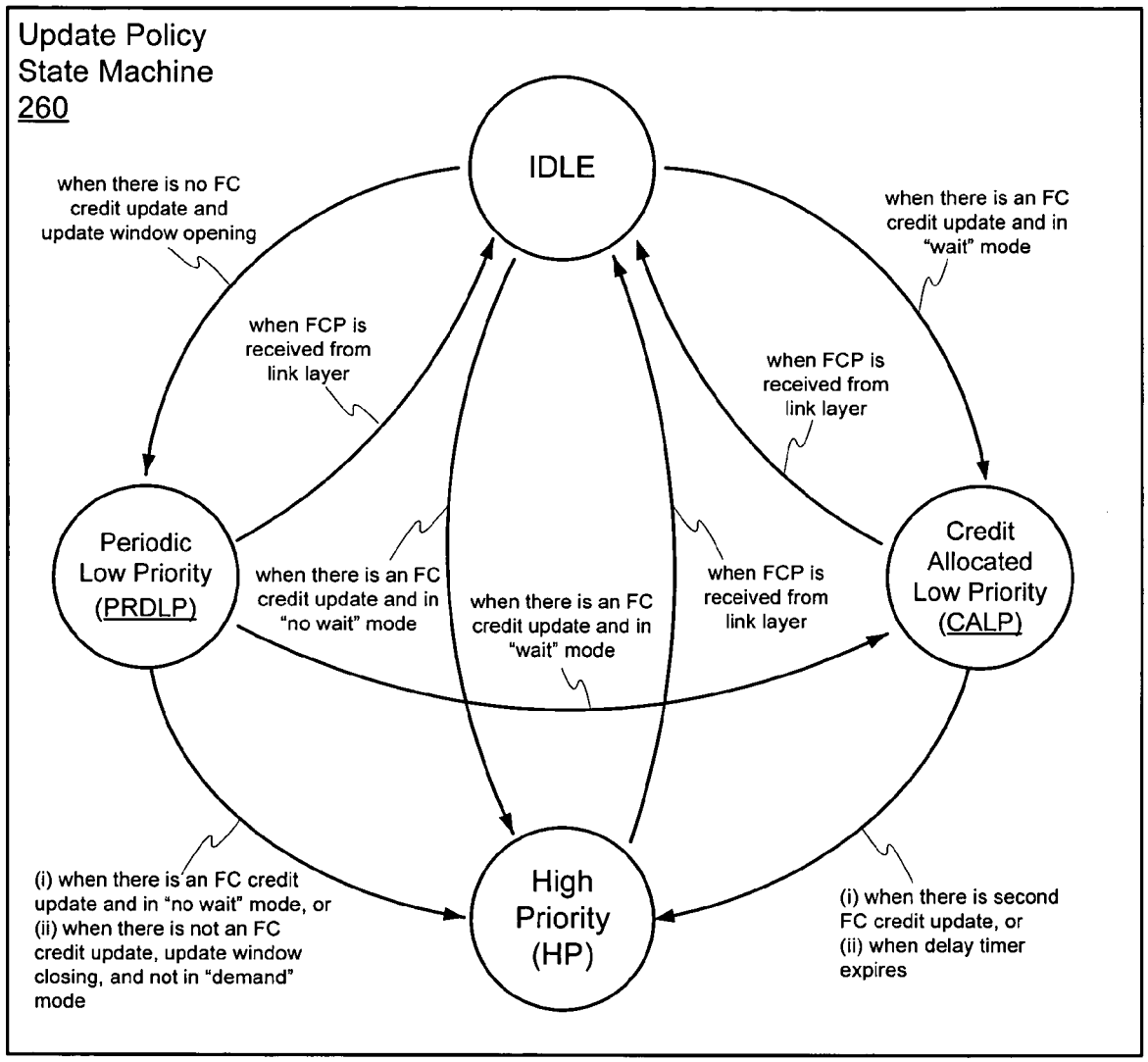
FIG. 6 illustrates a state diagram of an embodiment of the control logic shown in FIG. 2.

Referring now to FIG. 6, a state diagram depicting operation of one embodiment of the control logic 255 is illustrated. In particular, the control logic 255 may implement an IDLE state, a CALP (Credit Allocated Low Priority) state, a PRDLP (Periodic Update Low Priority) state, and an HP (High Priority) state. The IDLE state may be an initial/first state after reset. The control logic 255 may transition from the IDLE state to the PRDLP state when there is no FC credit update and the update timer 265 asserts the UW_OPEN signal to indicate the opening of the update window and that a periodic FC update may need to be generated and sent. Further, the control logic 255 may transition from the IDLE state to the HP state when there is a FC credit update and the policy register 245 indicates a "no wait" mode. Finally, the control logic 255 may transition from the IDLE state to the CALP when there is a FC credit update but the policy register 245 indicates a "wait" mode.

In the CALP state, the control logic 255 generally attempts to transmit the FC credit updates if there are no active TLP packets transmission on interconnect bus 190. If there is no transmission of TLP packets on interconnect bus 190, then, the control logic 255 may generate the FC update based upon the FC credit information stored in the credit registers 270 and cause a FC packet to be transmitted through link layer 210. The control logic 255 then transition from the CALP state to the IDLE state when the FC packet is received by the link layer 210. On the contrary, if the interconnect bus 190 is active with TLP packet transmission, then the control logic 255 may wait for the expiration of a delay period defined by the policy register 245 and the delay timer 250. The control logic 255 may transition from the CALP state to the HP state when the delay timer asserts its signal to indicate the delay period has expired. In HP state, the FC updates must be get transmitted immediately although there are active TLP packets transmission on interconnect bus 190. Further, the control logic 255 may transition from the CALP state to the HP state when there is a second FC credit update.

In the PRDLP state, the control logic 255 generally attempts to delay sending a periodic FC update during low power/power saving mode as long as permitted by the policy register 245 and the update register 260. To this end, the control logic 255 may transition from the PRDLP state to the IDLE state when a periodic FC packet is received by the link layer 210. The control logic 255 may further transition from the PRDLP state to the HP state when there is a normal FC credit update needs to be sent and the policy register 245 indicates a "no wait" mode.

The control logic 255 may transition from the PRDLP state to the HP state when there is otherwise no FC credit update needs to be sent and the update timer asserts the UW_CLOSE signal except when in the demand mode. When in the demand mode, the control logic 245 may stay in the PRDLP state despite the assertion of the UW_CLOSE signal if the transmit-once flag indicates the same FC update has already been transmitted.

In the HP state, the control logic 255 exits from a low power state if needed and sends a FC update. In particular, the control logic 255 may generate the FC update based upon the FC credit information stored in the credit registers 270 and cause a FC packet to be transmitted through link layer 210. The control logic 255 then transitions back to the IDLE state when the FC packet is received by the link layer 210.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising
transmitting a first flow control update across a bus based upon a first rate in response to a normal power mode,
transmitting a second flow control update across the bus based upon a second rate in response to a power saving mode,
wherein the first flow control update and the second flow control update control packet flow across the bus to prevent buffer overflow, and
defining a plurality of update windows, in response to a plurality of update modes, for use in a low power state, wherein at least one of the plurality of update windows is to cause transmission of flow control updates twice across the bus and not again until an occurrence of a change in a corresponding flow control credit.

2. The method of claim 1, further comprising setting the second rate to be slower than the first rate.

3. The method of claim 1, further comprising
transmitting a packet across the bus, and
generating the second flow control update to account for the packet transmitted across the bus.

4. The method of claim 1, further comprising
transmitting a packet across the bus, and
after a delay period from transmitting the packet has expired, transmitting the second flow control update to account for the packet.

5. The method of claim 1, further comprising
transmitting a first packet across the bus,
transmitting a second packet across the bus, and
generating the second flow control update to account for the first packet and the second packet if the second packet is transmitted before a delay period from transmitting the first packet has expired.

6. The method of claim 1, further comprising
transmitting a packet across the bus,
generating the second flow control update to account for the packet,
if in a wait mode of operation, transmitting the second flow control update after a delay period from transmitting the packet has expired, and
if not in the wait mode of operation, transmitting the second flow control update without waiting for the delay period to expire.

7. The method of claim 1, further comprising
if in a demand mode of the power saving mode, waiting for the second flow control update to differ from a previously transmitted flow control update before transmitting the second flow control update, and
if not in the demand mode of the power saving mode, transmitting the second flow control update before expiration of an update period defined by the second update rate regardless of whether the second flow control update differs from the previously transmitted flow control update.

8. The method of claim 1, wherein the at least one update window is to comprise a 30-40 μs (microsecond) update window.

9. An apparatus comprising
an update timer to define a first rate for a first power mode and a second rate for a second power mode,
control logic to cause transmission of a first flow control update based upon the first rate in response to the first power mode and to cause transmission of a second flow control update based upon the second rate in response to the second power mode, and
an update register to cause the update timer to define a plurality of update windows, in response to a plurality of update modes, for use in a low power state, wherein at one of the plurality of the update windows is to cause transmission of flow control updates twice across the bus and not again until an occurrence of a change in a corresponding flow control credit.

10. The apparatus of claim 9, wherein the update timer defines the second rate for the second power mode based upon a value of the update register.

11. The apparatus of claim 9, further comprising
a plurality of credit registers to account for different types of flow control credits, Wherein
the control logic updates the plurality of credit registers to account for flow control credits consumed by transmitted packets, and generates the first flow control update and the second flow control update to reflect status of the plurality of credit registers.

12. The apparatus of claim 9, further comprising
a policy register to define a wait mode of operation based upon a stored value of the policy register,
a delay timer to indicate expiration of a delay period, and
a plurality of credit registers to account for different types of flow control credits, wherein
the control logic updates the plurality of credit registers to account for flow control credits consumed by a packet transmission, resets the delay timer in response to the packet transmission, generates the second flow control update to reflect status of the different types of flow control credits, and causes the second flow control update to be transmitted in response to (i) the delay timer indicating the delay period has expired since the packet transmission, and (ii) the stored value of the policy register indicating the wait mode of operation.

13. The apparatus of claim 9, further comprising
a policy register to define a wait mode of operation based upon a stored value of the policy register,
a delay timer to indicate expiration of a delay period, and
a plurality of credit registers to account for different types of flow control credits, wherein
the control logic updates the plurality of credit registers to account for flow control credits consumed by a first packet transmission and a second packet transmission, resets the delay timer in response to the first packet transmission, generates the second flow control update to reflect status of the different types of flow control credits that account for the first packet transmission and the second packet transmission if the second packet transmission occurs before the delay timer indicates the delay period has expired since the first packet transmission.

14. The apparatus of claim 9 comprising
a policy register to define a wait mode of operation based upon a stored value of the policy register, and
a delay timer to indicate expiration of a delay period, wherein
the control logic causes a packet to be transmitted, resets the delay timer in response to the packet being transmitted, causes the second flow control update to be transmitted after the delay timer indicates the delay period has expired since the packet being transmitted if the stored value of the policy register indicates the wait mode of operation.

15. The apparatus of claim 9, further comprising
an update flag,
a plurality of credit registers to account for different types of flow control credits,
the update register to define the second rate of the update timer, wherein
the control logic asserts the update flag in response to an update to the plurality of credit registers, and causes the second flow control update to be transmitted in response to assertion of the update flag if a value of the update register indicates a demand mode.

16. The apparatus of claim 9, wherein the at least one update window is to comprise a 30-40 μs (microsecond) update window.

17. A system comprising
a memory controller coupled to memory to store instructions,
a processor to execute instructions of the memory,
an input/output controller coupled to the memory controller via a bus, the input/output controller to transmit a flow control update that indicates status of flow control credits of the input/output controller to the memory controller via the bus based upon a first rate for a power saving mode of the bus that is slower than a second rate for another power mode of the bus, and
an update register, coupled to the input/output controller, to cause an update timer to define a plurality of update windows, in response to a plurality of update modes, for use in a low power state, wherein at one of the plurality of the update windows is to cause transmission of flow control updates twice across the bus and not again until an occurrence of a change in a corresponding flow control credit.

18. The system of claim 17, wherein the input/output controller updates flow control credits in response to transmitting packets to an input/output device, and exits the power saving mode of the bus in response to transmitting the flow control update.

19. The system of claim 17, wherein the input/output controller updates flow control credits in response to transmitting a first packet, updates flow control credits in response to transmitting a second packet, generates the flow control update to account for the first packet and the second packet, and exits the power saving mode of the bus to transmit the flow control update.

20. The system of claim 17, wherein the input/output controller updates flow control credits in response to transmitting packets to an input/output device, and transmits the flow control update after a delay period from transmitting the packet has expired.

21. The system of claim 17, wherein the input/output controller
if in a demand mode, waits for the flow control update to differ from a previously transmitted flow control update before transmitting the flow control update, and
if not in the demand mode, transmits the flow control update before expiration of an update period defined by the first rate of the power saving mode regardless of whether the flow control update differs from the previously transmitted flow control update.

22. The system of claim 17, wherein the at least one update window is to comprise a 30-40 μs (microsecond) update window.

23. A storage device comprising a plurality of store instructions that cause a processor to:
configure an input/output interface to use first update rate to transmit flow control packets during a power saving mode of the computing device that is slower than a second update rate used to transmit flow control packets during another power mode of the computing device,
configure the input/output interface to enter the power saving mode in response to inactive periods of a bus, and
define a plurality of update windows, in response to a plurality of update modes, for use in a low power state, wherein at one of the plurality of the update windows is to cause transmission of flow control updates twice across the bus and not again until an occurrence of a change in a corresponding flow control credit.

24. The storage device of claim 23, wherein the plurality of instructions are to cause the processor to update a register of the input/output interface to set the first update rate.

25. The storage device of claim 23, wherein the plurality of instructions are to cause the processor to update a register of the input/output interface to place the input/output interface into a demand mode of operation in which flow control updates are transmitted in response to a change in flow control credits.

26. The storage device of claim 23, wherein the at least one update window is to comprise a 30-40 μs (microsecond) update window.

* * * * *